United States Patent Office 3,342,813
Patented Sept. 19, 1967

3,342,813
PROCESS FOR THE PREPARATION OF BU-
TENOLIDES DERIVED FROM CYCLOPEN-
TANO PERHYDRO PHENANTHRENES
Shalom Sarel, Yehuda Yanuka, and Yehuda Shalon, all
c/o School of Pharmacy, The Hebrew University—Ha-
dassah Medical School, P.O. Box 1172, Jerusalem,
Israel
No Drawing. Continuation of application Ser. No.
385,781, July 28, 1964. This application Jan. 13,
1967, Ser. No. 609,255
Claims priority, application Israel, Dec. 5, 1963,
20,378
8 Claims. (Cl. 260—239.57)

This is a continuation of copending application Ser. No. 385,781, filed July 28, 1964, now abandoned.

The present invention concerns a process for the preparation of butenolides of the general formula

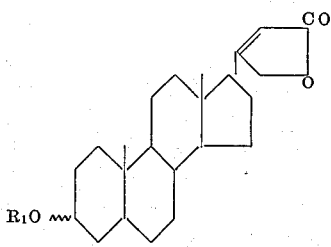

in which $R_1$ is H, a lower alkyl or a lower acyl radical. These butenolides have been found either to possess valuable pharmaceutical properties, or to be useful intermediates in the production of pharmaceutically active compounds. Thus, for example, the compound 14-desoxy-digitoxigenin has cardiac activity.

In accordance with the invention a compound of the above general Formula I is prepared by reacting a compound of the formula

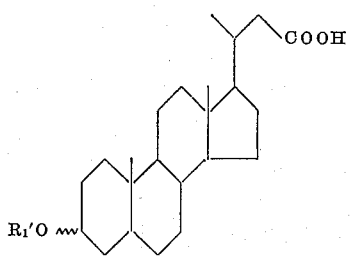

wherein $R_1'$ is a lower alkyl or acyl radical, with bromine in thionyl chloride, if desired, in the presence of a catalyst, followed, if desired by hydrolysis or alcoholysis to yield a compound of the formula

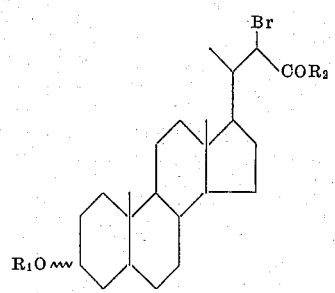

wherein $R_1$ is as in Formula I and $R_2$ is OH, Cl or lower alkoxy, provided that where $R_2$ is Cl it is converted into OH or lower alkoxy, the compound III is then reacted with sodium tert.butoxide in tert.butanol in the presence of sodium or potassium iodide to yield a compound of the formula

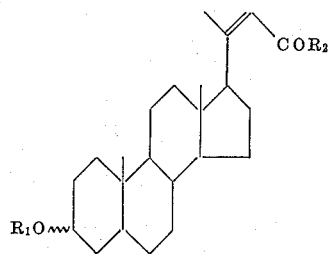

wherein $R_1$ and $R_2$ are as in Formula III, and the compound of Formula IV is reacted with selenium dioxide in an acidic medium which causes lactonization and yields a compound of the formula

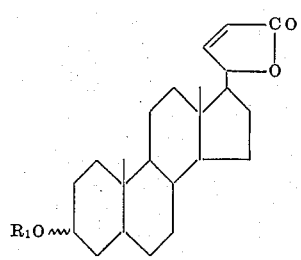

wherein $R_1$ is as in Formula I.

If desired the compound of Formula V in which $R_1$ is a lower acyl radical may be hydrolyzed under conditions in which the lactone ring remains intact, to yield a compound of the formula

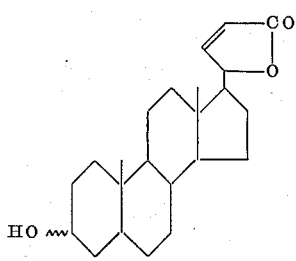

The catalysts suitable for use in the bromination step comprise hydrohalic acids, pyridine, pyridinium hydrobromide. It is also possible to effect bromination with pyridinium hydrobromide perbromide.

In the dehydrobromination of the compound III best results are obtained where the substratum is an ester. In this case the yield of the $\Delta^{20,22}$-compound is 90% or even higher. When the substratum is the acid chloride, the yield is somewhat lower. However, one of the immediate products of the bromination step is the 22-bromo-acid chloride. It may, therefore, in some cases be more advantageous to isolate this chloride and submit it directly to dehydrobromination rather than converting it first into the corresponding lower-alkyl ester.

Both the specific manner in which the bromination and the dehydrobromination steps are effected in the process according to the invention are surprising and could not have been anticipated from the literature. In particular, the specific dehydrobromination effect of sodium tert. butoxide in the presence of sodium or potassium iodide is surprising as it can be shown that other alkaline agents do not lead to the desired result.

The invention is illustrated by the following examples to which it is not limited:

EXAMPLE 1.—PREPARATION OF STARTING MATERIAL OF FORMULA III

(a) Preparation of lithocholic acid 50 g. of cholic acid was admixed with one litre of dry methanol containing 2.5 g. of hydrogen chloride in a 2-litre flask. The mixture was refluxed for two hours and thereafter concentrated to half its volume. The concentrate was transferred to a one-litre beaker and left to stand at room temperature overnight. A precipitate formed which consisted of 40 g. of colourless crystals melting at 154° C. The product was cholic acid methyl ester and the yield corresponded to 80% of the theory.

The procedure was repeated several times in order to obtain additional quantities of the ester.

106 g. of the above ester were converted into the corresponding 7,12-diketo-3-succinoxy compound by the method according to H. Heusser and H. Wuthier, H.C.A., 30, 2165 (1947). This diketo compound was admixed without isolation in a 3-litre flask with 500 cc. of an 85% aqueous hydrazine hydrate solution and 1000 cc. of ethylene glycol. The reaction mixture was refluxed for one hour at 100° C., then cooled, whereafter 200 g. of powdered potassium hydroxide was added through the condenser with simultaneous shaking of the flask. The potassium hydroxide was added over a period of half an hour at room temperature whereafter the condenser was removed and the mixture gradually heated at 200° C.

The reaction mixture was then refluxed for two to three hours and allowed to cool. To the cooled solution there was added 1.5 litres of hot water and the mixture was then transferred to a five litre Erlenmeyer flask where it was admixed with additional 1.5 litres of hot water. To the hot solution hot concentrated hydrochloric acid was added while stirring until the solution turned acidic. The precipitated lithocholic acid was purified by dissolution in hot 1 N aqueous potassium hydroxide solution. Upon cooling of the solution the potassium salt of lithocholic acid precipitated in a gelatinous manner. The precipitate was separated by centrifugation and the salt redissolved in hot water. The solution was acidified by the addition of hydrochloric acid and the precipitated lithocholic acid filtered off and recrystallized from a methanol-water mixture. In this manner 90 g. of lithocholic acid melting at 184° C. was obtained.

(b) Preparation of lithocholic acid methyl ester

The methyl ester of lithocholic acid was prepared by refluxing lithocholic acid for two hours in a 2.5% solution of hydrogen chloride in dry methanol. The solution was then concentrated to a small volume, extracted with benzene and the benzene extract washed first with water, then with an aqueous sodium bicarbonate solution and again with water. The washed extract was dried over sodium sulphate and thereafter concentrated to a volume of 100 cc. This concentrated solution was passed through an alumina column which was washed with benzene until the complete elution of the ester. The eluate was concentrated to a small volume and petroleum ether added. The solution was heated and allowed to cool down to room temperature. There was obtained a crystalline precipitate melting at 90–92° C. After drying in vacuo at 80° C. the melting point of the crystalline lithocholic acid methyl ester was 125–126° C.

(c) Preparation of 3α-acetoxy-norcholanyl-diphenyl ethylene

A solution of 0.2 mole of lithocholic acid methyl ester in 300 cc. of dry benzene was placed in a 3-litre flask and admixed with a solution of 3 moles of phenyl-magnesium bromide in dry ether. The reaction mixture was refluxed for three hours and thereafter concentrated in vacuo to a small volume. To the concentrated solution one litre of dry benzene was added and the resulting solution refluxed overnight. Thereafter the benzene solution was poured on ice and the mixture acidified with hydrochloric acid. The mixture was then extracted with benzene and the benzene extract washed with water and dried over sodium sulphate. Thereafter the benzene was evaporated in vacuo. The residue was (3α-hydroxy-cholanyl)diphenyl carbinol.

The above carbinol was admixed with a mixture of 60 cc. acetic anhydride and 100 cc. of dry pyridine. The reaction mixture was refluxed at 100° C. for 24 hours and thereafter the solvents removed by vacuum distillation. To the residue 200 cc. of glacial acetic acid was added and the reaction mixture again refluxed for 24 hours. After cooling pure 3α-acetoxy-norcholanyl-diphenyl ethylene was obtained, corresponding to the following formula

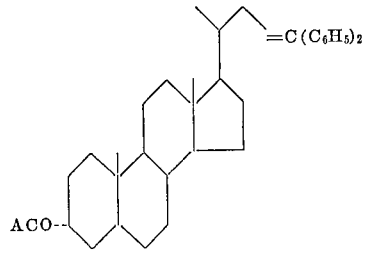

Analysis.—Calculated for $C_{38}H_{50}O_2$: C, 84.7%; H, 9.35%. Found: C, 84.7%; H, 9.39%.

U.V. spectrum: $_{max.}^{CHCl_3}$ 255–258 m$\mu$ (log=4.23); $\alpha_D^{20}=$ +67° (1% in $CHCl_3$)

I.R. spectrum (KBr): 3077, 2963, 2899, 1733 (acetate CO), 1650, 1595, 1495 (double bonds) 1246 (acetate CO), 757–760, 696–700 (CH aromatic) cm.$^{-1}$.

(d) Preparation of 3α-acetoxy-norcholanic acid 50 g. of 3α-acetoxy-norcholanyl-diphenyl-ethylene prepared in accordance with Example 1(c) above was suspended in 50 cc. of glacial acetic acid in a two-necked 250 cc. flask provided with a mehanical stirrer and a separation funnel. A suspension of 10 g. of chrominum trioxide in glacial acetic acid was added dropwise at a temperature of 40–45° C. The rate of addition of chromiumtrioxide was determined by the rate of oxidation and from time to time the adidtion had to be interrupted. After 48 hours the resulting solution was poured into one litre of water and the mixture extracted with chloroform. The chloroform extract was washed with water and the wash water back extracted twice with chloroform. The chloroform extracts were combined, the solvent evaporated and the residue dissolved in 150 cc. of benzene. The benzene extract was extracted with several 20–30 cc. portions of a 1 N aqueous potassium hydroxide solution saturated with sodium chloride (in order to prevent emulsification). The potassium salt of 3α-acetoxy-norcholanic acid separated in the aqueous phase and formed a suspension therein. This suspension was back extracted with benzene. After the completion of the extraction and back extraction the alkaline aqueous suspension was acidified with hydrochloric acid and the aqueous acidic solution was then extracted with benzene. The benzene extract was carefully washed with water and dried over sodium sulphate. The benzene was evaporated and the dry residue acetylated by refluxing for 24 hours in a solution of 2% of acetic anhydride in glacial acetic acid. This acetylation was necessary since during the preceding alkaline extraction the 3-acetoxy group was partially hydrolysed. After the termination of the refluxing the reaction mixture was concentrated to a 20 cc. volume and water was added dropwise until the appearance of a slight turbidity. The solution was then heated and allowed to cool whereupon colourless crystals precipitated which melted at 177–178° C. Yield 60–70%.

*Analysis.*—Calculated for $C_{25}H_{40}O_4$: C, 74.22%; H, 9.96%. Found: C, 72.89%; H, 10.68%. $\alpha_D^{20} = +51°$ (1% in $CHCl_3$)

Instead of using chromium troxide for the degradation of 3α-acetoxy-norcholanyl-diphenyl ethylene it is also possible to use sodium periodate in the presence of ruthenium oxide, or also ozone.

(e) *Preparation of 3α-hydroxy-norcholanic acid (norlithocholic acid)*

The above 3-acetoxy acid was refluxed in 1 N alcoholic potassium hydroxide for 20 hours. The alcohol was then evaporated on a water bath and the same volume of water added. There precipitated the potassium salt of 3α-hydroxy-norcholanic acid. The salt was filtered, washed twice with 10 cc. portions of a 1 N aqueous potassium hydroxide solution and dissolved in hot water. The hot water solution was acidified with hydrochloric acid whereupon the 3α-hydroxy-norcholanic acid (norlithocholic acid) precipitated. The crude acid was washed with water and recrystallized from methanol. There were obtained colourless crystals melting at 186° C.

*Analysis.*—Calculated for $C_{23}H_{38}O_3$: C, 76.55% H, 10.71%. Found: C, 76.59%; H, 10.82%. $\alpha_D^{20} = +32° \pm 3°$ I.R. spectrum (KBr): 3390(OH), 2924, 1718(CO), 1449, 1374, 1163, 1031 cm.$^{-1}$.

(f) *Preparation of 3-keto-norcholanic acid*

1.6 g. of 3α-hydroxy-norcholanic acid were dissolved in 20 cc. of glacial acetic acid inside a 100 cc. Erlenmeyer flask. A solution of 1.2 g. of chromium trioxide in glacial acetic acid was added dropwise at room temperature at a rate corresponding to the rate of oxidation, i.e. chromium trioxide was only added after the chromium trioxide in the reaction mixture was fully converted into tervalent chromium oxide (green colour). The oxidation was completed after the reaction mixture had turned brownish. Any excess of chromium trioxide is reduced by the addition of methanol. Thereafter the liquid phase was evaporated in vacuo, the residue extracted with ether, the extract washed with water and the ether evaporated. The residue consisted of crude 3-keto-norcholanic acid. It was crystallized from an acetone-water mixture and precipitated in the from of colourless crystals melting at 180 to 181° C. Yield 1.5 g.

*Analysis.*—Calculated for $C_{23}H_{36}O_3$: C, 76.41%; H, 10.3%. Found: C, 76.8%; H, 10.16%.

The chromium trioxide oxidation can also be effected in pyridine as solvent instead of glacial acetic acid.

(g) *Preparation of mesomeric 3-hydroxy-norcholanic acid*

Reduction of the 3-keto compound was effected catalytically under pressure in a Parr apparatus. To a solution of 1.5 g. of 3-keto-norcholanic acid in 30 cc. of acetic acid there was added 0.5 cc. of concentrated hydrochloric acid and 400 mg. of potassium dioxide. After shaking for 15 minutes in a hydrogen atmosphere under pressure of 50 p.s.i., the walls of the reaction vessel were rinsed with a small amount of acetic acid, the reaction mixture was diluted with water and the catalyst filtered off.

(h) *Splitting of epimeric 3-hydroxy-norcholanic acid into the 3α-hydroxy and 3β-hydroxy epimers*

1 g. of the mesomeric mixture obtained in accordance with the preceding example was admixed with 3 g. of digitonin in 700 cc. of ethanol (95%). The digitonide of the β-epimer precipitated immediately. The precipitate was filtered off, washed with ethyl alcohol and dried. The dry digitonide was dissolved in a small amount of pyridine and the solution left to stand for three hours at room temperature. In this manner the digitonide was decomposed into its components. 3β-hydroxy-norcholanic acid was isolated by extraction of the reaction mixture with ether. The insoluble material was filtered off and the ether solution washed with 1N aqueous sulphuric acid for the removal of pyridine. The ether was then removed by distillation and the residue crystallized from an ethanol-water mixture. 3β-hydroxy-norcholanic acid was obtained in the form of colourless crystals melting at 186-187° C. Upon admixture of the product with the α-epimer, the melting point was depressed by 25° C. Yield 50%.

*Analysis.*—Calculated for $C_{23}H_{38}O_3$: C, 76.55%; H, 10.71%. Found: C, 76.22%; H, 10.44%.

Instead of decomposing the β-hydroxy-norcholanic acid digitonide with pyridine it is also possible to effect the decomposition with methanol. The products obtained in both ways are identical.

(i) *Preparation of 3β-acetoxy-norcholanic acid*

A solution of 800 mg. 3β-hydroxy-norcholanic acid in 15 cc. of glacial acetic acid containing 2% by weight of acetic anhydride was refluxed in a 50 cc. flask for 24 hours. Thereafter water was added in small portions while continuing the heating, until the appearance of a slight turbidity. The solution was then allowed to cool and the 3β-acetoxy-norcholanic acid precipitated in the form of colourless crystals melting at 198° C.

*Analysis.*—Calculated for $C_{25}H_{40}O_4$: C, 74.22%; H, 9.96%. Found: C, 74.02%; H, 9.79%.

I.R. spectrum (KBr): 2950, 1739(COAc), 1718(CO), 1460–1420, 1389, 1266–1244(CO), 1163, 1031 cm.$^{-1}$.

(j) *Preparation of 3β-acetoxy-norcholanic acid methyl ester*

This ester was prepared by esterification of the acid described in the preceding example. M.P. 149° C.

*Analysis.*—Calculated for $C_{26}H_{42}O_4$: C, 74.60%; H, 10.10%. Found: C, 74.8%; H, 10.22%.

The 3-hydroxy-norcholanic acid and its functional derivatives obtained in accordance wtih this example were used for the preparation of the corresponding 22-bromo compounds as will be described in the following Example 2.

3β-acetoxy-norcholanic acid methyl ester may also be prepared from the 3α-epimer by an alternative procedure outlined in the following example (k).

(k) *Preparation of 3β-acetoxy-norcholanic acid methyl ester*

1 g. of methyl 3-hydroxy-norcholanate was dissolved in 5 cc. of dry pyridine and to it was added with shaking a solution of 750 mg. p-toluene sulfonyl chloride in 5 cc. of dry pyridine, at 0°. It was allowed to stand at 10–20° for 40 hours and then poured onto a mixture of ice and dilute hydrochloric acid.

The precipitate was collected, dissolved in chloroform, washed first with dilute hydrochloric acid and then with aqueous potassium carbonate and water. After drying the solvent was removed and the colorless solid of methyl 3-tosyl-norcholanate (1.4 g.) thus obtained was used further without purification. It was dissolved in 30 cc. of glacial acetic acid, and 1.5 g. of anhydrous lithium acetate was added. The mixture was refluxed for 18 hours and then solvent was removed by distillation in vacuo. The residue was taken up with chloroform, washed with water, dried, and the solvent removed. The residue gave upon recrystallization from ethanol 1.0 g. of colourless crystals of methyl 3β-acetoxy-norcholanate. M.P. 149° C. Over-all yield: 90%. It was identical with a specimen obtained in a manner described in Example 1(h),

EXAMPLE 2

(a) Preparation of 3α-acetoxy-22-bromo-norcholanic acid 3.4 g. of 3α-acetoxy-norcholanic acid were placed in a flask provided with a dropping funnel, a reflux condenser sealed with a calcium chloride tube and a duct linking the lower part of the reflux condenser with the upper part of the dropping funnel. 4 cc. of thionyl chloride was added through the dropping funnel and the mixture heated for one hour to 40–60° C. Thereafter a solution of 0.5 cc. of bromine and 0.75 cc. of pyridine in 3 cc. of thionyl chloride was added dropwise through the dropping funnel. The rate of bromine addition was in line with the rate of bromine consumption. After five hours of heating at 40–60° C. the reaction was completed and the solvents evaporated in vacuo. The residue was dried in vacuo at 50° C., cooled and admixed with 10 cc. of cold acetone. The mixture was stirred with a glass rod and crystals precipitated. The precipitate was filtered off and washed several times with 3 cc. portions of cold acetone. The crystals were then immediately dried in vacuo at 100° C. In this manner 2 g. of 3α-acetoxy-22-bromo-norcholanic acid was obtained in a yield of 50%. M.P. 198–200° C.

To the cold filtrate there was added at once 100 cc. of water and the mixture extracted with chloroform. The chloroform extract was carefully washed with water and then concentrated to a volume of 10 cc. 100 cc. of carbon tetrachloride was added and the solution passed through a column of 30 g. silica gel (diameter 2 cm., length 30 cm.). The column was first eluted with carbon tetrachloride until this solvent did not elute any further substance. The column was then eluted with a mixture of 100 parts of carbon tetrachloride and 30 to 100 parts of chloroform. There was obtained 3α-acetoxy-22-bromo-norcholanic acid in the form of crystals melting between 210 and 230° C. Yield 1.2 g.

The acid chloride obtained as described above was hydrolysed with an acetone-water mixture which yielded 3α-acetoxy-22-bromo-norcholanic acid. This product was identical wtih the one obtained from the mother liquor of the acid chloride.

The unsharp melting point of the 22-bromo acid is to be explained by the fact that the product is a mixture of two epimers in which the 22-bromo is of different configuration. By repeated chromatographic separation on silica gel and elution with chloroform-carbon tetrachloride, the acids could be separated into the three following fractions:

Fraction 1—Elution with a mixture of 100 parts carbon tetrachloride and 30 parts of chloroform which yielded about one-third of the starting material; M.P. 200–215° C.

Fraction 2—Elution with a mixture of 100 parts carbon tetrachloride and 60 parts of chloroform yielding another third of the product; M.P. 216–220° C.

Fraction 3—Elution with pure chloroform yielding another third of the product; M.P. unsharp between 200–220° C.

(b) Preparation of 3β-acetoxy-22-bromo-norcholanic acid

The 3β-epimer was prepared in complete analogy to the 3α-epimer desscribed in the previous Example 2(a) by using as starting material 3β-acetoxy-norcholanic acid.

EXAMPLE 3

(a) Preparation of 3α-hydroxy-$\Delta^{20,22}$-norcholenic acid 800 mg. of 3α-acetoxy-22-bromo-norcholanic acid was admixed with 2 cc. of thionyl chloride and refluxed for one hour at 40–60° C. with the exclusion of humidity. The reaction mixture was then cooled with ice water and dry methanol added in small portions of 20 cc. each. The reaction mixture was refluxed for half-an-hour and then left to stand at room temperature for four hours. The mixture was then extracted with benzene, the extract washed first with water, then with a 1 N aqueous sodium hydroxide solution and then again with water. The washed extract was dried over sodium sulphate and thereafter the solvent was evaporated. In this manner 3α-acetoxy-22-bromo-norcholanic acid methyl ester was obtained.

780 mg. of the above ester was dissolved in 40 cc. of tertiary butanol. The solution was admixed with 10 cc. of an 0.5 N solution of sodium tert. butoxide in tert. butanol and 800 mg. of sodium iodide. The reaction mixture was refluxed for about 3 days and thereafter concentrated to a small volume on a water bath. The concentrated solution was diluted with water, acidified with dilute hydrochloric acid and extracted with chloroform. The chloroform extract was reduced to a small volume and diluted with ten times its volume of carbon tetrachloride. The resulting dilute solution was fed into a silica gel column (60 cm. long and 2 cm. diameter) containing 30 g. of silica gel and the product eluted with a 1:1 chloroform/carbon tetrachloride mixture. In this manner 480 mg. (70% yield) of 3α-hydroxy-$\Delta^{20,22}$-norcholenic acid was obtained, M.P. 210–211° C.

(b) Preparation of 3β-hydroxy-$\Delta^{20,22}$-norcholenic acid

The 3β-epimer was prepared in complete analogy to the 3α-epimer described in the preceding Example 3(a), using as starting material 3β-acetoxy-22-bromo-norcholanic acid.

EXAMPLE 4

(a) Preparation of the butenolide of 3α-acetoxy-perhydro cyclopentano phenanthrene 370 mg. of 3α-hydroxy-$\Delta^{20,22}$-norcholenic acid were dissolved in 15 cc. of acetic acid, the solution was placed in a 50 cc. flask and 370 mg. of selenium dioxide were added. The reaction mixture was refluxed for two hours. Already in the first minutes there formed a black precipitate of selenium which increased in the course of the reaction. After the refluxing was completed, the mixture was filtered into a separating funnel and extracted with 100 cc. of benzene. The benzene extract was washed first with water and then with a 5% aqueous potassium carbonate solution for the complete removal of acidic substances. All the aqueous washings were combined and re-extracted in a second separating funnel with 50 cc. of benzene. The combined benzene solutions were dried over sodium sulphate and thereafter the benzene was evaporated to dryness. About 80% of the starting material was lactonized. The remaining 20% were acidic substances which passed over into the alkaline aqueous phase. The product contained a 3α-acetoxy group owing to acetylation in the course of the reaction, and had a yellow-brownish coloration. The crude substance could not be purified even upon repeated chromatography on silica gel. The U.V. absorption spectrum in alcoholic solution showed an absorption band at 217–218 mμ which is characteristic for butenolides. Against this, the absorption band at 224–226 mμ, which is characteristic for the unsaturated acid serving as starting material, was completely absent both in the lactone and in the acidic substances that went over into the alkaline aqueous phase.

(b) Preparation of the butenolide of 3β-acetoxyperhydrocyclopentano phenanthrene (the 3-acetyl derivative of 14-desoxy-digitoxigenin)

The preparation of this substance was effected in complete analogy to the preparation of the 3α-epimer described in the preceding Example 4(a), using as starting material 3β-hydroxy-$\Delta^{20,22}$-norcholenic acid.

Reaction with the legal reaction with both epimers was positive.

The I.R. spectrum (KBr) of both lactones revealed the following absorption bands: 2448, 2941, 1739 (CO), 1639 (C=C), 1462–1449, 1374, 1250 (CO), 1036 cm.⁻¹.

What is claimed is:

1. A process for the production of a compound of the general formula

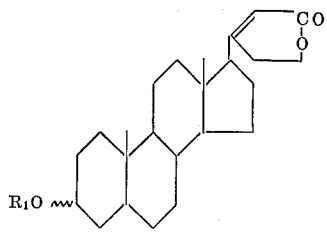

I in which $R_1$ is a member of the group consisting of hydrogen, lower alkyl radicals and lower acyl radicals which comprises reacting a compound of formula

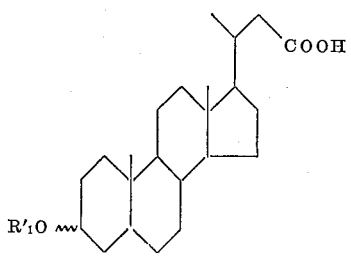

II in which $R'_1$ is a member of the group consisting of lower alkyl radicals and acyl radicals, with a brominating agent selected from the group of bromine and pyridinium hydrobromide, in thionylchloride, to yield a compound of formula

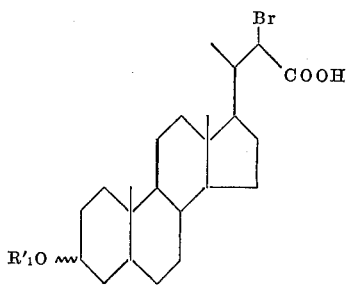

IIIa in which $R'_1$ has the same meaning as before, the latter is reacted with sodium tert. butoxide in tert. butanol in the presence of a catalyst being a member of the group consisting of sodium iodide and potassium iodide, to yield a compound of formula

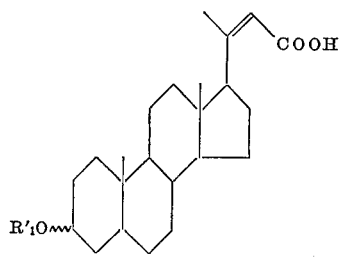

IVa in which $R'_1$ has again the same meaning as above and the latter is reacted with selenium dioxide in an acidic medium to yield the desired end product of Formula I.

2. The process according to claim 1, wherein said compound of Formula IIIa is converted into the corresponding ester of formula

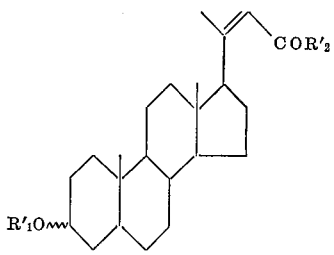

III in which $R'_2$ is a lower alkoxy radical and the latter is then further treated as specified in claim 1.

3. The process according to claim 1, comprising the step of hydrolyzing a 3-alkoxy group into a hydroxy group.

4. The process according to claim 1, comprising the step of converting a 3-alkoxy group into a different 3-alkoxy group by hydrolysis and re-etherification.

5. A process according to claim 1, comprising the step of hydrolyzing a 3-acyloxy group into a hydroxy group.

6. A process according to claim 1 for the preparation of compounds of Formula I in which $R_1$ is hydrogen, comprising the step of converting a 3-hydroxy group into a 3-acyloxy group.

7. The process according to claim 1 for the preparation of compounds of Formula I in which $R_1$ is hydrogen, comprising the step of converting a 3-hydroxy group into a 3-alkoxy group.

8. A process according to claim 1, wherein said acidic medium is glacial acetic acid.

References Cited
UNITED STATES PATENTS 2,362,439 11/1944 Ruzicka ---------- 260—397.1
2,461,910 2/1949 Miescher ---------- 260—397.1

ELBERT H. ROBERTS, *Primary Examiner.*